(No Model.)
S. H. HARRINGTON.
DEVICE FOR EXTINGUISHING FIRES AND PREVENTING THE ESCAPE OF STEAM IN RAILWAY CARS.
No. 381,924. Patented May 1, 1888.
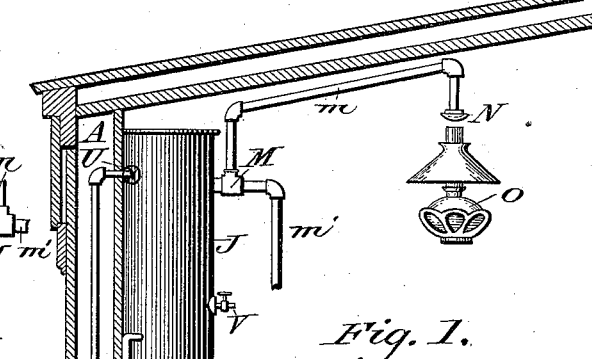
Fig. 4.
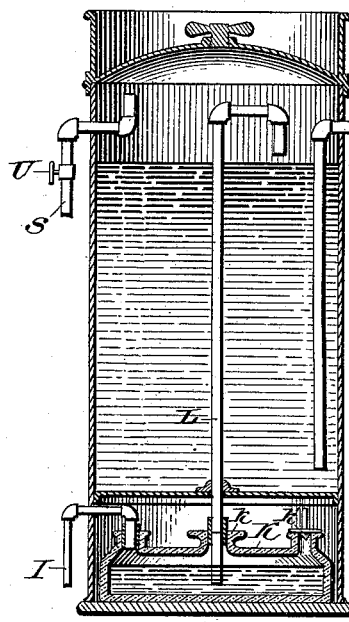
Fig. 2.
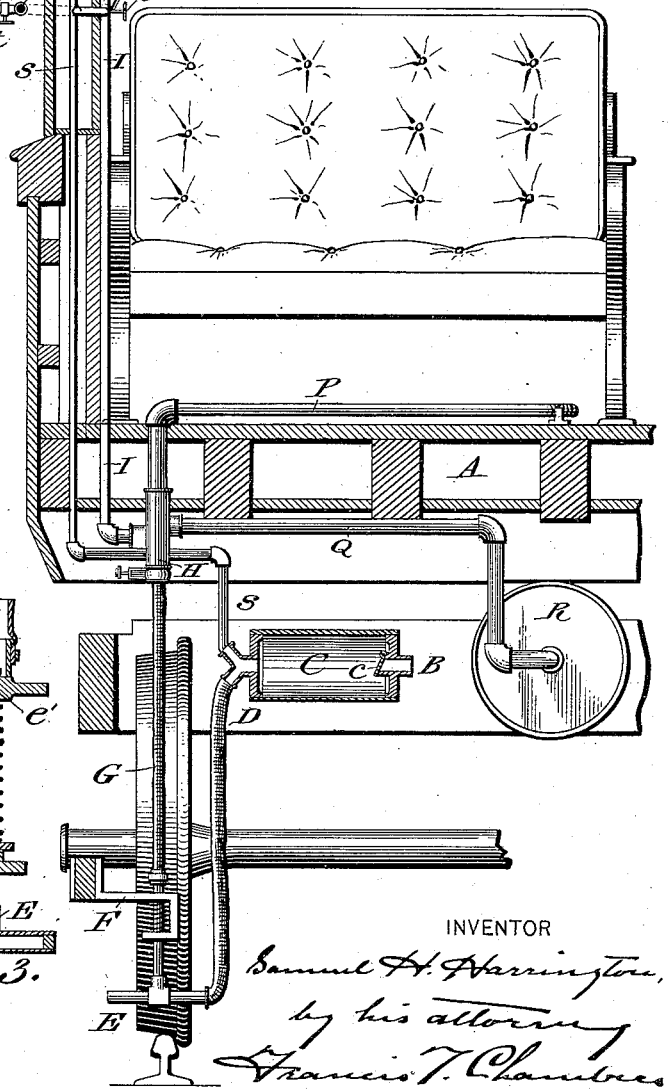
Fig. 1.
Fig. 3.
WITNESSES:
INVENTOR

UNITED STATES PATENT OFFICE.

SAMUEL H. HARRINGTON, OF COLUMBUS, OHIO.

DEVICE FOR EXTINGUISHING FIRES AND PREVENTING THE ESCAPE OF STEAM IN RAILWAY-CARS.

SPECIFICATION forming part of Letters Patent No. 381,924, dated May 1, 1888.

Application filed March 17, 1887. Serial No. 231,249. (No model.)

*To all whom it may concern:*

Be it known that I, SAMUEL H. HARRINGTON, of Columbus, county of Franklin, State of Ohio, have invented a new and useful Improvement in Devices for Extinguishing Fires and Preventing the Escape of Steam on Railway-Cars, of which the following is a true and exact description, due reference being had to the accompanying drawings, which form a part of this specification.

My improvement relates to that class of devices in which the stored air in the air-brake system is utilized to actuate the fire-extinguisher in case of accident or emergency; and it has for its object to provide an appliance whereby the steam in a car heated by steam-radiators will be released from the steam-pipes and conveyed to a point of safety in case of accident; to combine this device with a fire-extinguisher, which, in case of accident, will extinguish the fire in the heater, and also with a derailment-trip for setting the brakes, and, further, to provide appliances whereby fires can be extinguished at will, even where no derailment has occurred.

Reference being now had to the drawings which illustrate my invention, and in which Figure 1 is a section through a railway-car showing my appliances as they are arranged and combined together and with the car. Fig. 2 is a section through my device for releasing the steam at the same time that the air from the brake system is in escaping directed to the actuating device of the fire-extinguisher. Fig. 3 is a view of a derailment-trip, which can be conveniently used with my device; and Fig. 4 is a section through a fire-extinguisher, which I have found it convenient to use in this connection.

A is the car-body; B, a pipe forming part of or connected with the air-brake system.

C is a storage-reservoir connected with pipe B, and having a valve, $c$, which permits the compressed air to enter it freely, but closes when the pressure is released from pipe B, thus maintaining a constant supply of compressed air, whether the brakes are applied or not.

D is a pipe or air-hose leading from reservoir C to a derailment-trip, E, which may be of any convenient construction, by which the passage between pipes D and G is closed by a valve, which is opened by the derailment of the train. The device, as shown in Fig. 3, is well adapted for this purpose.

G is a pipe or hose leading from the derailment-trip E to the valve-chamber H. In this chamber (see Fig. 2) the end of pipe H is closed by a valve, $h$, having guides $h'$, which extend down into the cylindrical top of pipe G, or that part of the chamber H which forms an extension of said pipe. $h^2$ is a spring-detent, which, when valve $h$ is raised, springs under its guide $h'$ and prevents the valve from falling back upon its seat. To valve $h$ is secured a rod, $h^3$, which, after passing through a securely-packed stationary ring or disk, $h^4$, is secured to a valve, $h^5$, of smaller diameter and area than valve $h$. Above the valve $h^5$, which has a seat in casing H, and is so arranged on rod $h^3$ that it is seated and closed when valve $h$ is also closed, is a guide, $h^7$, between which and valve $h^5$ may be secured a spring, $h^6$, to aid in keeping the valves $h$ and $h^5$ down upon their seats.

I is a pipe leading from the chamber in H, formed between valve $h$ and packing-ring $h^4$ to the actuating device of a fire-extinguisher, (here shown as a bottle of sulphuric acid, K,) into which the pipe I passes, and from which a pipe, L, leads to a reservoir, J, filled with a solution of soda, the air-pressure forcing the acid into the reservoir, from which a pipe, M, leads to the fires in the car, any number of branches $m$ $m'$ being provided. This device I do not intend to claim in this application, and only show it as representing my approved fire-extinguishing device, any other being equally applicable for use with my invention.

The air from the brake system or tank C, having been admitted to pipe G by the tripping of rod E, in passing into the pipe I, elevates the valve $h$ from its seat. The rod $h^3$, attached to this valve, is elevated at the same time and raises the smaller valve, $h^5$, from its seat, thus connecting pipes P and Q. This pipe P is a part of the steam-pipe system by which the car is heated, and the elevation of valve $h^5$ allows the steam to escape through pipe Q into a tank, R, which I secure beneath the car and prefer to fill with sawdust or some other absorbent material, which will prevent the escape of the steam around the wrecked cars in case of derailment.

The detent $h^2$, by springing under the valve $h$, keeps both it and the steam-valve $h^5$ open and insures both the free escape of air from the brake system and the free escape of steam from the steam-pipes within the car. The device for releasing the steam can of course be used without the extinguisher where it is not necessary to provide means for putting out fires in case of derailment.

As fires are liable to occur in a car from other causes than its derailment, I have provided means whereby the water or extinguishing-fluid in the tank J can be forced either onto the fires in the heaters and lamps or to any desired point at will. Leading from the reservoir C, I provide a pipe, S, which enters the top of the water-tank, and has preferably, also, a branch, T, leading into pipe I. Both branches of this pipe are provided with valves $t$ and U, and a nozzle, V, with a stop-cock is also provided in the tank J, to which nozzle a hose may be attached, if desired. As will be at once seen, the acid can be at any time thrown into tank J by simply opening valve $t$, which allows the air from reservoir C to pass into the acid-bottle, where it acts as has been before described; or, if a jet of water is wanted at any place within reach of the hose attached to nozzle V, the air may be admitted through valve U to the top of the tank, where its pressure will add force to the jet without requiring the acid to be used. A valve in pipe M may be used to cut off the passage to the ordinary heaters or fires when it is desired to use the hose.

The construction of the extinguisher-tank with its acid-receptacle, its connection with the air-brake system through a conduit closed by a valve arranged to be opened by the motion of a derailment-trip, and the special construction of the trip and its valve shown in the drawings form no part of this invention, being fully described in the pending application filed by myself and Edward Grafstrom, March 12, 1887, Serial No. 230,587, for an improvement in devices for extinguishing fires in railway-cars.

The special derailment-trip shown has been selected simply as being well adapted for use with my present device, but may be replaced by any of the various well-known forms, and its connection with a valve in the conduit leading from the brake system may be made in any convenient way, such, for instance, as that shown in my pending application filed February 19, 1887, Serial No. 228,274, or in the patent of Brockway and Watts, No. 267,667, dated November 21, 1882.

It will be easily seen that some parts of my improved device are capable of useful employment even where it is not desired to employ it as a whole, and I do not wish to be understood as limiting my claims on the use of the special details of the appliance save where they are specifically referred to in the claims.

Having now described my invention, what I claim as new, and desire to secure by Letters Patent, is—

1. In combination with the air-brake system and steam-heating system of a railway-car, a conduit leading from the brake system and closed by a valve, a derailment-trip connected with this valve so as to open it when actuated, and a valve-chamber, H, connected by one passage with the steam-pipes and by another with the conduit leading from the air-brake system, said chamber having valves $h$ and $h^5$, a rod, $h^3$, uniting said valves, and a discharge-orifice between said valves, so that the escape of the air past valve $h$ will raise valve $h^5$ from its seat and allow the steam to escape.

2. In combination with the air-brake system and steam-heating system of a railway-car, a conduit leading from the brake system and closed by a valve, a derailment-trip connected with this valve so as to open it when actuated, and a valve-chamber, H, connected by one passage with the steam-pipes and by another with the conduit leading from the air-brake system, said chamber having valves $h$ and $h^5$, a rod, $h^3$, uniting said valves, a spring-detent, $h^2$, to prevent the valves from closing, and a discharge orifice between said valves, so that the escape of the air past valve $h$ will raise valve $h^5$ from its seat and allow the steam to escape.

3. In combination with the air-brake system and steam-heating system of a railway-car, a conduit leading from the brake system and closed by a valve, a derailment-trip connected with this valve so as to open it when actuated, and a valve-chamber, H, connected by one passage with the steam-pipes and by another with the conduit leading from the air-brake-system, said chamber having valves $h$ and $h^5$, a rod, $h^3$, uniting said valves, a tight packing-disk, $h^4$, separating the air from the steam-passages, a spring-detent, $h^2$, to prevent the valves from closing, an air-escape passage, I, and a steam-escape passage, Q.

4. In combination with the air-brake system and steam-heating system of a railway-car, a conduit leading from the brake system and closed by a valve, a derailment-trip connected with this valve so as to open it when actuated, and a valve-chamber, H, connected by one passage with the steam-pipes and by another with the conduit leading from the air-brake system, said chamber having valves $h$ and $h^5$, a rod, $h^3$, uniting said valves, a tight packing-disk, $h^4$, separating the air from the steam-passages, a spring-detent, $h^2$, to prevent the valves from closing, an air-escape passage, I, a steam-escape passage, Q, and a vessel, R, connected with said steam-passage and filled with absorbent material.

5. In combination with the air-brake system and steam-heating system of a railway-car, a conduit leading from the brake system and closed by a valve, a derailment-trip connected with this valve so as to open it when actuated, and a valve-chamber, H, connected by one passage with the steam-pipes and by another with the conduit leading from the air-brake system, said chamber having valves $h$ and $h^5$, a rod, $h^3$, uniting said valves, a tight packing-disk, $h^4$, separating the air and steam passages, escape-pipes I and Q for air and steam, respectively, and a fire-extinguisher, J, secured to the air-exit pipe I, so that the air, after passing chamber H and releasing the steam, will escape into and actuate the extinguisher.

6. In combination with the air-brake system and steam-heating system of a railway-car, a conduit leading from the brake system and closed by a valve, a derailment-trip connected with this valve so as to open it when actuated, and a valve-chamber, H, connected by one passage with the steam-pipes and by another with the conduit leading from the air-brake system, said chamber having valves $h$ and $h^5$, a rod, $h^3$, uniting said valves, a tight packing-disk, $h^4$, separating the air and steam passages, escape-pipes I and Q for air and steam, respectively, a fire extinguisher, J, and an acid-receptacle interposed between the extinguisher and air-escape pipe, so that the air after passing chamber H and releasing the steam will force the acid into the extinguisher-tank.

7. In combination with the air-brake system of a railway-car and an extinguisher-tank, a conduit leading from the brake system to the said tank, a valve for closing said conduit, and a derailment-trip arranged to open said valve when actuated, together with a separate conduit leading from the brake system into said tank, and one or more valves in said conduit by which air can be admitted to the extinguisher-tank at will.

8. In combination with the air-brake system of a railway-car and an extinguisher-tank, a conduit leading from the brake system, an acid-receptacle interposed between said conduit and the said tank, a valve for closing said conduit, and a derailment-trip arranged to open said valve when actuated, together with a separate conduit leading from the brake system into said tank, and one or more valves in said conduit by which air can be admitted to the extinguisher-tank at will.

9. The combination, with the air-brake system and steam-heating system of a railway-car, of the reservoir C, connected with the air-brake system, the conduits D and G, the hollow derailment-trip E, connecting said conduits, the valve-chamber H, connected with the conduit G, and having a rod, $h^3$, and valves $h$ $h^5$, secured upon said rod, a conduit, P, connecting the valve-chamber with the steam-pipes, a receptacle, R, and steam-escape pipe Q, leading from valve-chamber H to vessel R.

10. The combination of the reservoir C, connected with the air-brake system, the conduits D G, having the derailment-trip E as a connection, the valve chamber H, having valves $h$ $h^5$, tight disk $h^4$, and conduit I, connecting the pipe G with an extinguisher when valve $h$ is opened, all substantially as and for the purpose specified.

11. The combination of the reservoir C, connected with the air-brake system, the conduits D G, having the derailment-trip E as a connection, the valve chamber H, having valves $h$ $h^5$ and tight disk $h^4$, the steam system P, opening into chamber H when valves $h$ $h^5$ are raised, the conduit I, connecting pipe G with an extinguisher when valve $h$ is opened, and the conduit S, leading direct to extinguisher and having valves $t$ and U, whereby air can be admitted to the extinguisher at will.

SAMUEL H. HARRINGTON.

Witnesses:
   E. A. DAWSON,
   FRANK L. BORTON.